Aug. 3, 1943.  C. W. LEGUILLON  2,325,690
DRIVING APPARATUS FOR CRAWLER TYPE VEHICLES
Filed May 31, 1941
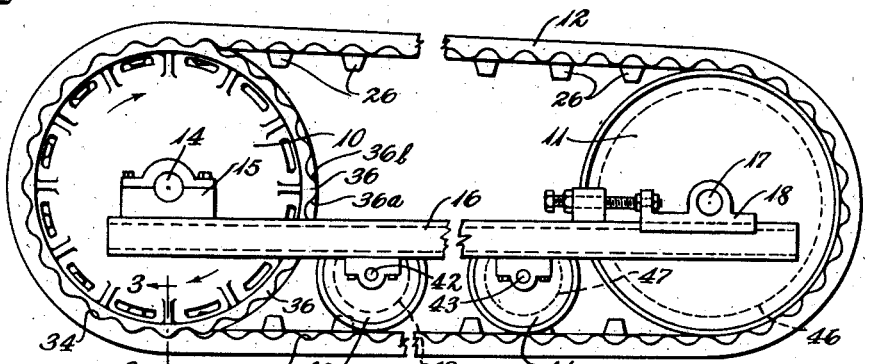
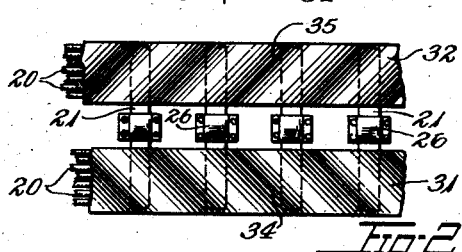
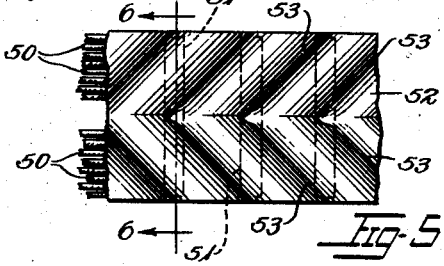
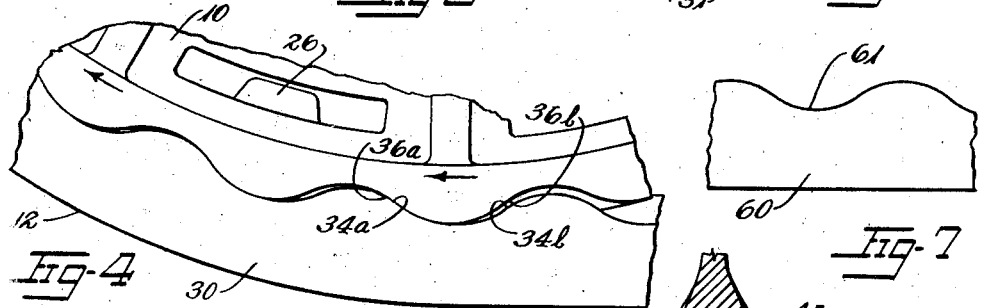
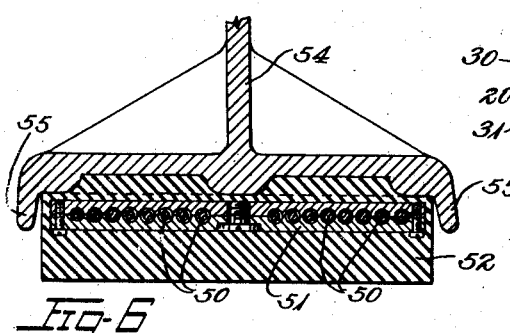
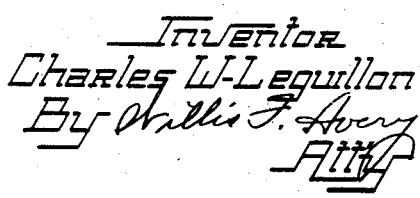
Inventor
Charles W. Leguillon
By Willis F. Avery
Att'y Patented Aug. 3, 1943

2,325,690

UNITED STATES PATENT OFFICE 2,325,690

DRIVING APPARATUS FOR CRAWLER TYPE VEHICLES

Charles W. Leguillon, Akron, Ohio, assignor to The B. F. Goodrich Company, New York, N. Y., a corporation of New York Application May 31, 1941, Serial No. 395,951

5 Claims. (Cl. 305—10)

This invention relates to driving apparatus for crawler type vehicle or vehicles of the self-laying track type.

Heretofore, devices of the crawler type have been of such construction that they have required accurate machining of metallic parts, as it has been the purpose usually to provide accurately spaced driving teeth or sprockets on the drive wheel and to provide accurately spaced means on the flexible track for cooperation with the driving teeth. Small deviations from the proper fit of the parts often have resulted in faulty performance or undesirable noisy operation, and the construction often has been very costly to produce.

The principal objects of the invention are to provide driving apparatus in which the driving load is transmitted between the driving wheel and the flexible track by wedging means, to provide for maintaining the driving engagement by tensioning of the track, to provide a self-energizing driving engagement, to provide quiet operation, to provide for effectively guiding the track, to reduce or eliminate parts that require accurate machining, to provide strong driving traction, and to provide simplicity of construction and convenience of manufacture.

These and other objects will appear from the following description and the accompanying drawing.

Of the drawing:

Fig. 1 is a side elevation of driving apparatus constructed according to and embodying the invention, parts being broken away.

Fig. 2 is a plan view showing the wheel-contacting face of a portion of the track of Fig. 1, other portions being broken away.

Fig. 3 is a cross-sectional view taken on line 3—3 of Fig. 1.

Fig. 4 is a side view of a portion of one of the drive wheels and the track to a larger scale showing the track as tensioned in use.

Fig. 5 is a view like Fig. 2 but showing a modified construction.

Fig. 6 is a sectional view like Fig. 3 but showing the track of Fig. 5 and its cooperating drive wheel, the section being taken on line 6—6 of Fig. 5.

Fig. 7 is a side elevation of a further modified construction.

In accordance with the invention driving engagement of the endless track and wheel is effected through wedging surfaces in a manner such that the driving force tends to expand the endless track and resist slippage of said surfaces by an increase of tension in the track. One or both of the engaging surfaces of the track and wheel are preferably of resilient material and one or both of such surfaces are inclined to the direction of travel of the track in a manner to provide the wedging action.

Referring to the embodiment of Figs. 1 to 4 of the drawing, the numeral 10 designates a drive wheel, 11 an idler wheel, and 12 the flexible track extending thereabout. The drive wheel is fixed to a shaft 14 journaled in bearings 15 fixed to the frame 16 of the vehicle. Shaft 14 is driven from the power plant of the vehicle in any desired manner. The track may be also guided by bogie wheels 40, 41 mounted on the frame 16.

The idler wheel 11 is fixed to an idler shaft 17 journaled in bearings 18 mounted on the frame 16. The bogie wheels are also freely rotatable on their shafts 42, 43.

The flexible track preferably comprises spaced-apart tension members in the form of substantially non-stretchable metallic cables 20 held in laterally spaced-apart relation by cross-bars 21 each comprising a pair of elements 22, 23 having complementary grooves 24 for receiving the cables. Each cable is enclosed by a cushion layer 25 of rubber-like material which cushions it resiliently from the cross-bars and transmits the driving force between the bars and the cables. Guiding elements 26, 26 may be mounted on the cross-bars, if desired, for keeping the track aligned on the wheel.

The cables and the cross-bars are preferably completely enclosed by a resilient body 30 of rubber-like material. The cables may be arranged in two spaced-apart groups, as in Fig. 3, and the resilient body may be separated longitudinally to provide two spaced-apart bodies 31, 32 separated by a space 33 across which the bars 21 extend.

The wheel-contacting face of the track is formed with cross grooves 34, 35 adapted to cooperate with driving elements which elements may be in the form of ribs 36 extending across the face of the drive wheel. Each cross groove has load-transmitting faces 34a, 34b, at its leading and trailing margins, which are inclined to the direction of motion of the track, so as to present smooth inclined surfaces to be engaged respectively by surfacees 36a, 36b, of the driving wheel ribs, according to the direction of travel, for transmitting the load between the drive wheel and the track by a wedging action. This wedging action, by its tendency to enlarge the endless track, results in an increase of pressure on the wedging surfaces and some sliding thereof until a balance of forces is attained to resist further slippage of the surfaces by shear stresses in the parts. Thus, the track is maintained on the driving wheels by a self-energizing action under the driving force.

These cross grooves may extend straight across the face of the track but preferably are disposed diagonally thereof in opposite directions in herringbone fashion as shown in Fig. 2, so that they act simultaneously to guide and center the track as well as to transmit the driving load thereto, while at the same time presenting a smooth supporting surface to the bogie wheels.

Where the track has a divided rubber body, as in the embodiment of Fig. 3, additional guiding means may be provided in the form of metallic lugs 26 secured to the cross-bars between the rubber bodies 31, 32 and adapted to guide the track by engaging within a groove 45 formed at the center of the face of the drive wheel, and similar central guiding grooves 46, 47, 48 are provided in the idler and bogie wheels for guiding purposes.

The metal cables resist stretching of the track and hold the pitch of the grooves relatively uniform, while at the same time the cushioning material provides a cushioned drive which permits use of cast driving wheels and makes unnecessary the use of accurately machined wheels. The drive is relatively noiseless because of the rubber-to-metal contact of the wheel and track.

While it is preferred to employ grooves well spaced from each other, providing extensive reaches of relatively flat wheel-supporting surface between them, the grooves may if desired be relatively close together and may have humped portions therebetween, and the entire wheel-contacting surface of the track or the track-contacting surface of the wheel may even have a contour of or approximating a sine curve, as shown at 61 in Fig. 7 wherein 60 designates the track.

By the provision of a multiplicity of closely-spaced driving grooves and driving elements on the wheel and track cooperating with each other substantially positive driving without undesirable slippage is provided, since for slippage to occur would require the simultaneous lifting of a plurality of grooves from contact with the driving elements. Also, if the track be lifted from the wheel at one position, as by a foreign object lodging therebetween, other grooves at other positions around the periphery of the wheel will maintain engagement with other driving elements.

In the embodiment of Figs. 5 and 6 all the tension cables 50, 50 and cross bars 51, 51 are embedded in a single body 52 of rubber-like material. The grooves 53, 53 may be extended to an apex at the center of the track as shown and the driving lugs on the wheel may be similarly disposed or terminated short of the apex to assure an even distribution of pressure along the wedging surfaces. In addition to the guiding effected by the herringbone arrangement of the grooves, or in lieu of such guiding in case it is desired to dispose the grooves straight across the track, the wheel 54 may be provided with marginal flanges 55, 55 overlying the sides of the track. Such side guiding flanges may be incorporated also in the embodiment of Figs. 1 to 4, if desired to supplement or replace the center guiding lugs.

Variations may be made without departing from the scope of the invention as it is defined by the following claims.

I claim:

1. Driving apparatus for a self-laying track-type vehicle, said apparatus comprising a driving wheel and a flexible endless track comprising an extensive flexible tension-resisting element extending along said track, said track being trained about said wheel, said wheel and track each having a plurality of surface portions cooperable in pairs, one of the pair being on the wheel and the other on the track and the surface portions of the pair being inclined obliquely to a plane tangential to the wheel at the surface portions during engagement in a manner to drive the track and also to support the track upon the wheel both through the engagement of the same pair of surface portions and to provide engagement of such surface portions by a wedging action tending to urge the track outwardly from the wheel and thereby tending to impose increased tension in the track under the driving force.

2. Driving apparatus for a self-laying track-type vehicle, said apparatus comprising a driving wheel and a flexible endless track trained about said wheel, said wheel and track each having a plurality of surface portions cooperable in pairs, one of the pair being on the wheel and the other on the track, at least one of the pair of surface portions being of resilient rubber-like material and the surface portions of the pair being inclined obliquely to a plane tangential to the wheel at the surface portions during engagement in a manner to provide engagement of such surface portions of the pair by a resilient wedging action tending to urge the track outwardly from the wheel and thereby tending resiliently to impose increased tension in the track under the driving force.

3. Driving apparatus for a self-laying track-type vehicle, said apparatus comprising a driving wheel and a flexible endless track trained about said wheel, said wheel and track each having a plurality of surface portions cooperable in pairs, one of the pair being on the wheel and the other on the track and the surface portions of the pair being inclined obliquely to a plane tangential to the wheel at the surface portions during engagement in a manner to drive the track and also to support the track upon the wheel both through the engagement of the same pair of surface portions and to provide engagement of said surface portions by a wedging action tending to urge the track outwardly from the wheel and thereby tending to impose increased tension in the track under the driving force, the surface portions being provided by continuous smoothly sinuous surfaces on the wheel and track.

4. Driving apparatus for a self-laying track-type vehicle, said apparatus comprising a driving wheel and a flexible endless track trained about said wheel, said wheel and track each having a plurality of surface portions cooperable in pairs, one of the pair being on the wheel and the other on the track and at least one of the pair being of resilient rubber-like material and the surface portions of the pair being inclined obliquely to a plane tangential to the wheel at the surface portions during engagement and also obliquely in such plane in herringbone fashion in a manner to drive the track and also to support the track upon the wheel both through the engagement of the same pair of portions and to provide engagement of said surface portions by a wedging action tending to impose increased tension in the track under the driving force.

5. Driving apparatus for a self-laying track-type vehicle, said apparatus comprising a driving wheel and a flexible endless track trained about said wheel, said track being centrally divided to provide axially spaced-apart flexible bands, said wheel and said track each having a plurality of surface portions cooperable in pairs, one of the pair being on the wheel and the other on the track and the surface portions of the pair being inclined obliquely to a plane tangential to the wheel at the surface portions during engagement and also obliquely in such plane in opposite directions in the respective bands of the track in herringbone fashion in a manner to drive the track and also to support the track upon the wheel both through the engagement of the same pair of surface portions and to provide engagement of such surface portions by wedging action tending to urge the track outwardly from the wheel and thereby tending to impose increased tension in the track under the driving force.

CHARLES W. LEGUILLON.